(12) United States Patent
Eggert et al.

(10) Patent No.: US 7,693,287 B2
(45) Date of Patent: Apr. 6, 2010

(54) SOUND SOURCE LOCALIZATION BASED ON BINAURAL SIGNALS

(75) Inventors: Julian Eggert, Obertshausen (DE); Volker Willert, Darmstadt (DE); Raphael Stahl, Bobenheim-Roxheim (DE); Juergen Adamy, Rossdorf (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 1308 days.

(21) Appl. No.: 11/137,981

(22) Filed: May 25, 2005

(65) Prior Publication Data
US 2005/0276419 A1    Dec. 15, 2005

(30) Foreign Application Priority Data
May 26, 2004    (EP)    ................................. 04012473
Dec. 23, 2004   (EP)    ................................. 04030651

(51) Int. Cl.
*H04R 5/00*   (2006.01)
*H04R 5/02*   (2006.01)

(52) U.S. Cl. .......................... 381/17; 381/309; 381/310

(58) Field of Classification Search ............. 381/17–19, 381/303, 307, 309–310, 61
See application file for complete search history.

(56) References Cited

U.S. PATENT DOCUMENTS

| 3,838,593 | A | 10/1974 | Thompson |
| 4,933,915 | A | 6/1990 | Boström |
| 6,990,205 | B1 * | 1/2006 | Chen ........................... 381/17 |
| 2003/0035553 | A1 * | 2/2003 | Baumgarte et al. ......... 381/94.2 |
| 2004/0076301 | A1 * | 4/2004 | Algazi et al. ................ 381/17 |
| 2008/0170711 | A1 * | 7/2008 | Breebaart et al. ............ 381/77 |

FOREIGN PATENT DOCUMENTS

| EP | 1 586 421 A1 | 10/2005 |
| EP | 1 600 791 A1 | 11/2005 |

OTHER PUBLICATIONS

Andersson, S. B., et al., "Robot Phonotaxis with Dynamic Sound-source Localization," Proceedings of the 2004 IEEE International Conference on Robotics & Automation, Apr. 2004, pp. 4833-4838, Piscataway, New Jersey, U.S.A.

Berglund, E., et al., "Sound source localisation through active audition," Intelligent Robots and Systems, IEEE, Aug. 2005, 6 Pages, Piscataway, New Jersey, U.S.A.

(Continued)

*Primary Examiner*—Vivian Chin
*Assistant Examiner*—George C Monikang
(74) *Attorney, Agent, or Firm*—Fenwick & West LLP

(57) ABSTRACT

Techniques are disclosed for sound source localization based on joint learning and evaluation of ITD and ILD representations that are measured in a complementary, correlation-based way using binaural time-frequency spectrums. According to one embodiment, from these measurements and learned representatives, which may, for example, be created by combinations of measurements from signals belonging to the same class, i.e., the same azimuthal location, probability distributions over frequency and class are computed. These probability distributions can be combined over cue and frequency using information-theoretic approaches to get a robust classification of the location and additionally a confidence measure for the quality of the classification result.

8 Claims, 2 Drawing Sheets

OTHER PUBLICATIONS

Bechler, D. et al., "Three Different Reliability Criteria For Time Delay Estimates," EUSIPCO 2004, XII. European Signal Processing Conference, Sep. 6, 2004, 4 Pages [online] [Retrieved on Apr. 5, 2006] Retrieved from the Internet <URL:http;//www.eurasip.org/content/Eusipco/2004/defevent/papers/cr1196.pdf>.

Blauert, J., "Spatial Hearing: The Psychophysics of Human Sound Localization," 1996, 65 Pages, 2nd Edition, The MIT press, USA-Cambridge MA.

Horiuchi, T. et al., "Iterative Compensation Of Microphone Array And Sound Source Movements Based On Minimization Of Arrival Time Differences," 2004 IEEE Sensor Array and Multichannel Signal Processing Workshop Proceedings, Barcelona Spain, Jul. 2004, pp. 566-570, Piscataway, New Jersey, U.S.A.

European Search Report, EP 06 000 319.1, Apr. 20, 2006, 8 Pages.

European Search Report, EP 06 011 270.3, Nov. 28, 2006, 11 Pages.

Huang, J. et al., "Sound Localization in Reverberant Environment Based on the Model of the Precedence Effect," IEEE Transactions on Instrumentation and Measurement, Aug. 1997, pp. 842-846, vol. 46, No. 4.

Nakadai, K. et al., "Real-Time Sound Source Localization and Separation for Robot Audition," Proceedings of the 2002 International Conference on Spoken Language Processing, ICSLP, 2002, pp. 193-196.

Nakashima, H. et al., "Self-Organization Of A Sound Source Localization Robot By Perceptual Cycle," IEEE Proceedings of the $9^{th}$ International Conference on Neural Information Processing (ICONIP '02), Nov. 2002, pp. 834-838, vol. 2, Piscataway, New Jersey, U.S.A.

Valin, J-M. et al., "Robust Sound Source Localization Using a Microphone Array on a Mobile Robot," Intelligent Robots and Systems, Oct. 2003, 6 Pages.

Adamy, J. et al., "A Binaural Sound Localization System for Mobile Robots in Low-Reflecting Environments," Automatisierungstechnik, 2003, pp. 387-395, vol. 51.

European Search Report, EP 04030651, Mar. 15, 2005, 2 pages.

Jin, C. et al., "Neural System Identification Model of Human Sound Localization," J. Acoust. Soc. Am., Sep. 2000, pp. 1215-1235, vol. 108, No. 3.

Nakadai, K. et al., "Epipolar Geometry Based Sound Localization and Extraction for Humanoid Audition," Proceedings of the 2001 IEEE/RSJ International Conference on Intelligent Robots and Systems, Oct. 29-Nov. 3, 2001, pp. 1395-1400.

Nakadai, K. et al., "Real-Time Active Human Tracking by Hierarchical Integration of Audition and Vision," Proceedings of the 2001 IEEE-RAS International Conference on Humanoid Robots, 2001, 8 pages.

* cited by examiner

SOUND SOURCE LOCALIZATION BASED ON BINAURAL SIGNALS

CROSS-REFERENCE TO RELATED APPLICATIONS

This application is related to and claims priority from European Patent Applications No. 04 012 473.7 filed on May 26, 2004 and 04 030 651.6 filed on Dec. 23, 2004, which are all incorporated by reference herein in their entirety.

FIELD OF THE INVENTION

The present invention relates to the field of sound source localization, and especially to sound source localization based on binaural signals.

BACKGROUND OF THE INVENTION

One of the primary ways that we separate sounds is to locate them in space. A sound from a fixed sound source arriving at two detectors (e.g. the ears, or two microphones) causes the two measured signals to be displaced in time with each other, due to a difference in transmission time. In a first approximation, this can be thought of as a difference in the straight line path from the sound source to the detectors. The time displacement is called ITD (Interaural Time Differences) and can be used to extract information about the azimuthal location of the sound source.

In addition, incident sound waves are usually diffracted and damped by the configuration (3D-shape, material) of the recording devices, e.g. a robot head. This causes a significant difference at the signal levels at the two ears. This so-called ILD/IID (Interaural Level Differences/Interaural Intensity Differences) is frequency dependent. For example, at low frequencies there is hardly any sound pressure difference at the two ears. However, at high frequencies, where the wavelengths of the sound get short in relation to the head diameter, there may be considerable differences, e.g. due to the head shadow effect. These differences vary systematically with the position of the sound source and can be used to gain information about its location.

ITD and ILD signals work in complementary ways. The accuracy of both varies independently according to the frequency range and the azimuthal sound source location. For non-preprocessed signals, at high frequencies, ambiguities in the ITD occur, since there are several possible cycles of shift. Incorporating ILD signals, which resolve the ambiguity providing reliable level differences for just these high frequencies, can level this out. The contribution of ITD cues to sound source localization is larger for frontally arriving signals and gets poorer with the sound source moving to the side because of a nonlinear dependency of the path difference from the angle of incidence. To the contrary, ILD cues are more accurate at the side areas because one recording device gets maximally damped and the other one minimally damped in this case. Similarly, ILD cues are less accurate at the frontal area because of reduced damping differences.

Conventional sound source localization methods include ITD calculations that operate on each frequency channel separately via delay lines (Jeffreys model), or by comparing different frequency channels by systematically shifting them against each other (stereausis model). ILD and monaural cues are explicitly modeled with head-related transfer-functions (HRTF's) (location-dependent spectral filtering of the sound because of outer ear/microphone-shape/material.)

In conventional methods, three problems concerning azimuthal sound source location remain. First, it is usually important to know in advance which delay resp. time shift corresponds to which azimuthal orientation to be able to pick the right representative vector for a particular orientation. Second, for adaptivity reasons it is desirable to bypass explicit models of ITD/ILD generation, instead, these should be "learnable" in an easy fashion. Another problem is how to combine ITD and ILD information that is highly frequency dependent. ITD and ILD are often computed using conceptually different procedures that make it nontrivial to compare the two measurements.

SUMMARY OF THE INVENTION

In view of the above-mentioned deficiencies of conventional methods, it is an object of this invention to provide an improved technique of sound source localization based on binaural signals.

One embodiment of the present invention provides a method for joint learning and evaluation of ITD and ILD representations that are measured in a complementary, correlation-based way using binaural time-frequency spectrums as gained e.g. from preprocessing filter banks. According to one embodiment, for each time step, from these measurements and learned representatives (for example, created by combinations of measurements from signals belonging to the same class, i.e., the same azimuthal location) probability distributions over frequency and class are computed. According to a further embodiment, these probability distributions extracted for different frequencies and ITD and ILD measurements can be seen as redundant information for the momentary sound location. According to yet another embodiment, for each time step, they can be combined over cue and frequency using information-theoretic approaches to get a robust classification of the location and additionally a confidence measure for the quality of the momentary classification result (e.g. the probability of the maximum a-posteriori estimate serves as a good confidence measure, directly extracted from the probability distribution). According to a still further embodiment of the present invention, the probability distributions can additionally be propagated over time to generate predictions for the next measurements, which improves classification results and allows the system to track moving sound sources.

One embodiment of the present invention provides a method for azimuthal sound source localization for a binaural detector configuration, comprising the steps of:

preprocessing two or more signals generated by a binaural detector using a filter bank to gain a (2D) time-frequency spectrum;

jointly determining ITD and ILD measures using a common matching procedure working on 2D patches of the time-frequency spectrum. According to one embodiment of the present invention, this results in frequency vs. displacement matrices for the ITD measurement and the ILD measurement that jointly characterize the sound source. According to a further embodiment, these matrices are used as a whole (all displacements and all frequencies) in the following steps;

learning averaged frequency vs. displacement matrices for different sound source locations. According to one embodiment of the present invention, this is done separately for the ITD and the ILD measurements;

comparing a measured frequency vs. displacement matrix with the learned matrices to gain one or more probability distributions for the sound source location for one or more frequency channels. According to one embodiment of the present invention, this is done both for the ITD and the ILD measurements. According to a further embodiment of the present invention, the one or more probability distributions include at least one of an ITD probability distribution or an ILD probability distribution. According to a still further embodiment of the present invention, a probability distribution comprises a probability distribution matrix;

combining the one or more probability distributions to gain a joint probability distribution for the sound source localization at a particular time step. According to one embodiment of the present invention, an ITD probability distribution matrix is combined with an ILD probability distribution matrix to gain the joint probability distribution; and estimating the sound source location based on the joint probability distribution.

According to one embodiment of the present invention, estimating the sound source location is based on the combined ITD and ILD probability distribution matrices. According to a further embodiment of the present invention, information-theoretic procedures are applied to extract the best estimation for the sound source location at a time step. According to a still further embodiment of the present invention, information-theoretic procedures are used to generate predictions that are combined with future measurements to improve sound source localization over time and/or to enable the system to track and follow moving sound sources.

According to one embodiment of the present invention, combining the probability distributions, such as combining the ITD and ILD measurement results, is done in a frequency-dependent way. According to a further embodiment, combining the probability distributions, such as combining the ITD and ILD measurement results, is done depending on a sound source location parameter. According to one embodiment of the present invention, the extracted probability distributions for the sound source localization are be used to gain information about multiple sound sources.

According to another embodiment, information can also be gained for sound source locations in a vertical direction extracting cues by learning binaural characteristics specific for elevation.

Another embodiment of the present invention provides a system comprising a binaural detector and a computing unit designed to process the output of the detector according to methods explained herein for sound source localization.

A further embodiment of the present invention is directed to a computer software program product implementing the methods explained herein for sound source localization when running on a computing device.

DETAILED DESCRIPTION OF THE PREFERRED EMBODIMENTS

Figure 1:
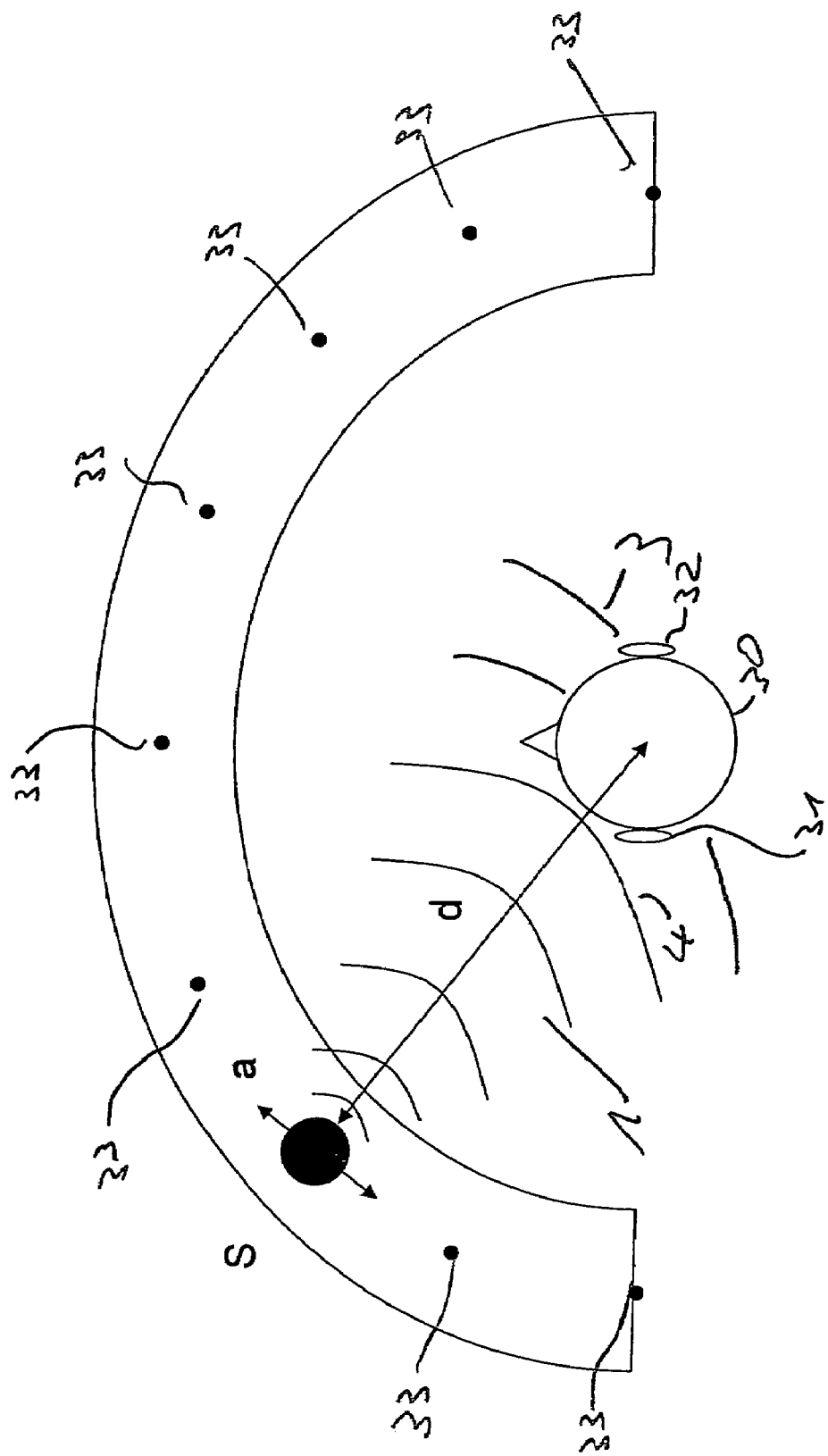
FIG. 1 shows a setup for implementing a learning step, according to one embodiment of the present invention.

One embodiment of the present invention provides techniques for calculating sound source location for binaural signals by using two sound receptors displaced against each other. According to one embodiment of the present invention, two sound receptors are displaced against each other in the azimuthal plane. A further embodiment of the present invention provides for extraction, representation and combination of two types of signals: ITD and ILD/IID.

Sound source localization according to one embodiment of the present invention is now explained with reference to FIG. 1 and FIG. 2.

A method according to one embodiment of the present invention provides for localization of the origin S of a binaural signal 1 on the basis of two sound signal components 3, 4 detected by a binaural detector 30, i.e. a detector having at least two separated acoustic sensors 31, 32. According to one embodiment of the present invention, the binaural signal 1 is thereby detected 2 by the two sensors (receptors) 31, 32 shifted in the azimuthal plane.

a.) Learning Frequency Vs. Displacement Matrices According To One Embodiment of the Present Invention According to one embodiment of the present invention, the two signals 3, 4 are preprocessed 5 in order to obtain two 2D time-frequency spectra 6, one for each signal 3, 4. According to another embodiment, ITD and ILD measures for every time step of the 2D time-frequency spectra are then calculated 7 using correlation algorithms to extract 2D frequency vs. displacement matrices separately for ITD and ILD that are dependent on the azimuthal location. According to a further embodiment, the correlations are computed by comparing point-wise windowed regions from the time-frequency spectrum of signal 3 with corresponding windowed regions from the time-frequency spectrum of signal 4. According to one embodiment, for ITD the point-wise comparison can be calculated, for example via SSD (the sum of squared differences) or the standard correlation coefficient. According to another embodiment, for ILD it is done by calculating the difference of absolute values norm after logarithmical preprocessing of the spectrum. According to a further embodiment, the correlations are computed for all required displacements, such as by shifting the 2D time-frequency spectra against each other to detect every possible time shift. According to a still further embodiment, the maximum displacement parameter can be determined experimentally and depends on the frequency bandwidth, the shape of the head and the distance between the two detectors.

According to one embodiment of the present invention, the result of said joint determination is used to generate 9 two different frequency vs. displacement matrices 10, 11 for every time step of the 2D time-frequency spectra relating to the ITD and the ILD measurement respectively. For example, at each time step the two frequency vs. displacement matrices 10, 11 jointly characterize the sound source.

According to one embodiment of the present invention, the next step consists in learning 12, 13 frequency vs. displacement matrices 14, 15 for different sound source locations 33. According to one embodiment, learning is done in a supervised way, which means the sound location 33 is known during the learning process. According to a further embodiment, this learning step is done separately for the ITD and for the ILD measurements and results in ITD and ILD reference frequency vs. displacement matrices that are representatives for specific locations 33 for all possible frequencies.

Figure 2:
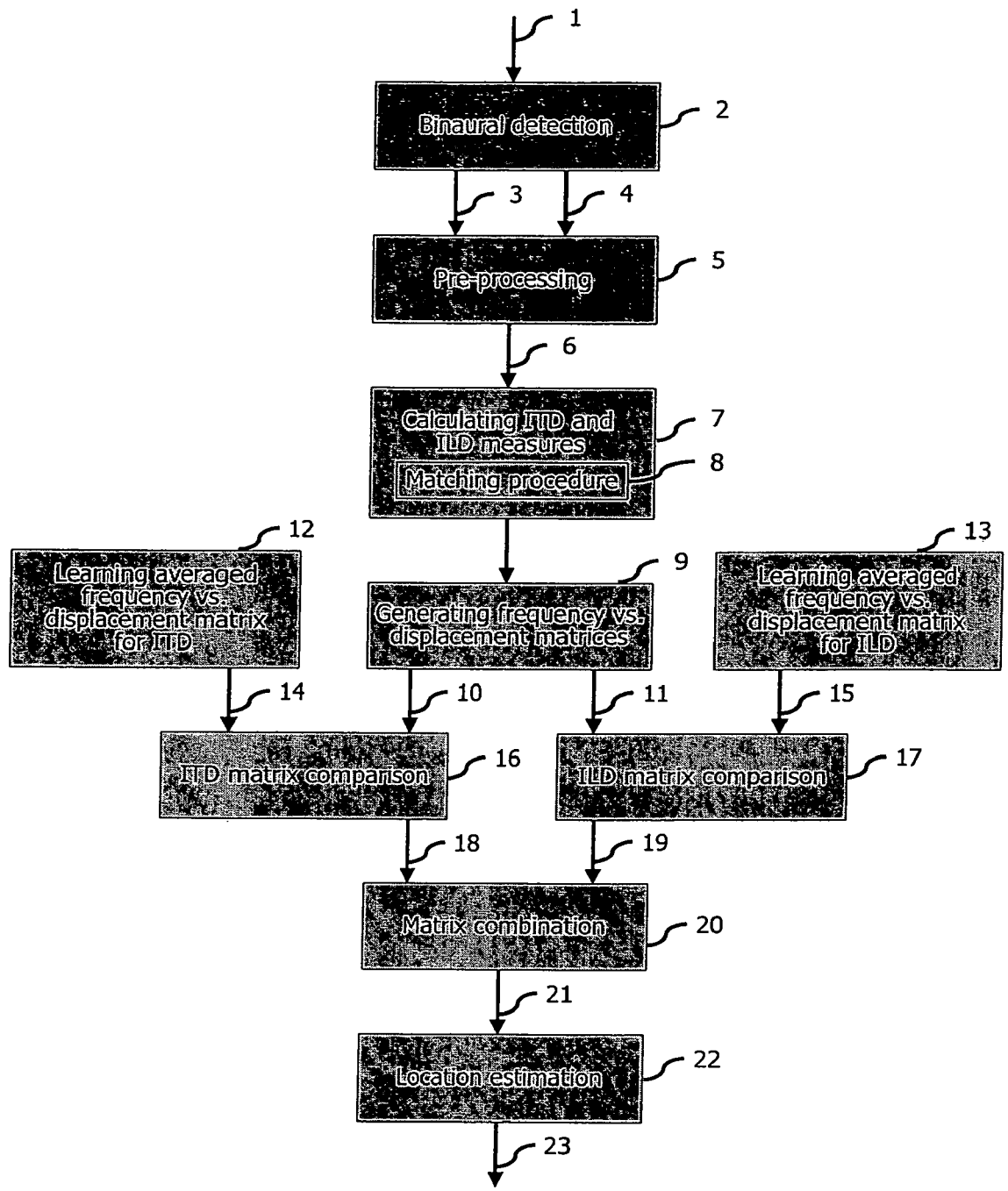
FIG. 2 shows a flow chart of a method for sound source localization processing, according to one embodiment of the present invention.

FIG. 1 illustrates how learning can be done according to one embodiment of the present invention. Referring to FIG. 1, according to one embodiment, a sound source S is placed at a particular distance d at a particular azimuthal location a. According to another embodiment, different signals, such as speech signals spoken from different persons, covering the frequency spectrum that the system should be able to locate are played from the sound source S and the frequency vs. displacement matrices are calculated. According to a further embodiment, all matrices for the same location are averaged to gain general ITD and ILD frequency vs. displacement matrices. According to a still further embodiment, this procedure is done for all chosen locations 33. According to one embodiment of the present invention, the 2D reference patterns change smoothly over azimuthal angle, and consequently only a few discrete locations for learning need to be processed during the learning step. For example, these discrete locations for learning may be equally distributed over the azimuthal plane.

b.) Estimating the Location of An Unknown Sound Source By Using the Learned Frequency Vs. Displacement Matrices, According To One Embodiment of the Present Invention According to one embodiment of the present invention, measured ITD and ILD frequency vs. displacement matrices 10, 11 of a sound source with unknown location are compared 16, 17 with the learned frequency vs. displacement matrices 14, 15 in order to gain a probability distribution 18, 19 for the sound source location for each frequency channel. According to another embodiment, the comparison is performed separately for the ITD and the ILD. For example, the ITD comparison 16 consists in comparing the measured frequency vs. displacement matrix 10 with the learned frequency vs. displacement matrices (2D reference patterns) 14 of the ITD and outputting an ITD probability distribution matrix 18.

According to one embodiment of the present invention, the ITD and ILD probability distribution matrices 18, 19 are further combined 20 to gain a single joint probability distribution 21 for the sound source localization. According to another embodiment, this combination 20 of the ITD and ILD probability distributions 18, 19 can be done depending on the sound source location parameter. According to a further embodiment, the combination of the ITD and ILD measurement results can be done in a frequency-dependent way.

According to a still further embodiment, the extracted probability distributions for ITD and ILD 18, 19 can be further used to gain information about multiple sound sources. To achieve this according to one embodiment, every probability distribution in the matrices is interpreted as a conditional probability for the measurement that is conditioned by frequency, cue (ITD, ILD) and location. Marginalization over frequency and cue leads to a probability conditioned only by the location.

According to one embodiment of the present invention, information-theoretic procedures are applied to said probability distribution 21 to extract 22 the best estimation 23 for the sound source location. According to a further embodiment, a Bayesian approach can be used to get an estimate of the location. For this, the posterior is be calculated using a prior and the probability distribution 21 now acting as a likelihood. According to another embodiment, the estimate of the azimuthal sound source location can then be calculated from the posterior by using standard methods like, for example, MAP (maximum a posteriori) or MMSE (minimum mean square error).

One embodiment of the present invention comprises a step that propagates a last time step probability distribution 21 in time to gain a prediction of the probability distribution of a next time step, which can then be combined with a newly measured probability distribution to improve it over time. Therefore, one embodiment of the present invention can be used to track sound sources that vary their location in a continuous way.

A further embodiment of the present invention provides for information to be gained for sound source locations in a vertical direction extracting cues by learning binaural characteristics specific for elevation.

The present invention may be embodied in various forms and should not be construed as limited to the embodiments set forth herein. Rather, these embodiments are provided so that disclosure will be thorough and complete and will fully convey the invention to those skilled in the art. Further, the apparatus and methods described are not limited to rigid bodies. While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without department from the spirit and scope of the invention as it is defined in the appended claims.

What is claimed is:

1. A computer based method for sound source localization comprising the steps of:
    (a1) receiving two or more signal components of a binaural signal originating from a known sound source at a known position, said known sound source being a device capable of generating a binaural signal;
    (a2) generating a two dimensional time-frequency spectrum, having two frequency channels, for each of said two or more signal components;
    (b) jointly determining an interaural time difference (ITD) measurement and an interaural level difference (ILD) measurement of the time-frequency spectrum to generate frequency verses time displacement matrices for the ITD measurement and for the ILD measurement that jointly characterize the known sound source;
    (c1) generating an ITD learned matrix by learning for the ITD measurement the averaged frequency verses time displacement matrix by repeating steps (a) and (b) with different positions of the known sound source;
    (c2) generating an ILD learned matrix by learning for the ILD measurement the averaged frequency verses time displacement matrix by repeating steps (a) and (b) with different positions of the known sound source;
    (d1) generating an ITD probability distribution matrix for the sound source location for each of said frequency channels by comparing for the ITD measurement a measured frequency verses time displacement matrix of a second sound source with the ITD learned matrix, wherein a position of said second sound source is unknown;
    (d2) generating an ILD probability distribution matrix for the sound source location for each of said frequency channels by comparing for the ILD measurement a measured frequency verses time displacement matrix of the second sound source with the ILD learned matrix;
    (e) generating a joint probability distribution for the second sound source by combining said ITD probability distribution matrix and said ILD probability distribution matrix; and
    (f) estimating the second sound source location based on the joint probability distribution.

2. The method of claim 1, wherein said ITD probability distribution matrix and said ILD probability distribution matrix are used to identify information about multiple sound sources.

3. The method of claim 1, wherein information is gained for sound source locations in a vertical direction extracting cues by learning binaural characteristics specific for elevation.

4. The method of claim 1, wherein said joint probability distribution is propagated or extrapolated in time to gain a prediction of a next joint probability distribution, which is then combined with a newly measured joint probability distribution to improve accuracy over time or to track moving sound sources.

5. The method of claim 1, wherein said estimating step further comprises applying information theoretic procedures to extract a best estimation for the second sound source location and a confidence measure for a quality of the momentary location estimation.

6. The method of claim 1, wherein said step of generating a joint probability distribution includes combining said ITD probability distribution matrix and said ILD probability distribution matrix in a frequency-dependent manner.

7. A system comprising a binaural detector and a computing unit designed to process an output of the binaural detector according to a method having the steps of:
- (a1) receiving two or more signal components of a binaural signal originating from a known sound source at a known position, said known sound source being a device capable of generating a binaural signal;
- (a2) generating a two dimensional time-frequency spectrum, having two frequency channels, for each of said two or more signal components;
- (b) jointly determining an interaural time difference (ITD) measurement and an interaural level difference (ILD) measurement of the time frequency spectrum to generate frequency verses time displacement matrices for the ITD measurement and for the ILD measurement that jointly characterize the known sound source;
- (c1) generating an ITD learned matrix by learning for the ITD measurement the averaged frequency verses time displacement matrix by repeating steps (a) and (b) with different positions of the known sound source;
- (c2) generating an ILD learned matrix by learning for the ILD measurement the averaged frequency verses time displacement matrix by repeating steps (a) and (b) with different positions of the known sound source;
- (d1) generating an ITD probability distribution matrix for the sound source location for each of said frequency channels by comparing for the ITD measurement a measured frequency verses time displacement matrix of a second sound source with the ITD learned matrix, wherein a position of said second sound source is unknown;
- (d2) generating an ILD probability distribution matrix for the sound source location for each of said frequency channels by comparing for the ILD measurement a measured frequency verses time displacement matrix of the second sound source with the ILD learned matrix;
- (e) generating a joint probability distribution for the second sound source by combining said ITD probability distribution matrix and said ILD probability distribution matrix; and
- (f) estimating the second sound source location based on the joint probability distribution.

8. A computer program product embodied on a computer readable medium which when executed by a computer performs the method of:
- (a1) receiving two or more signal components of a binaural signal originating from a known sound source at a known position, said known sound source being a device capable of generating a binaural signal;
- (a2) generating a two dimensional time-frequency spectrum, having two frequency channels, for each of said two or more signal components;
- (b) jointly determining an interaural time difference (ITD) measurement and an interaural level difference (ILD) measurement of the time-frequency spectrum to generate frequency verses time displacement matrices for the ITD measurement and for the ILD measurement that jointly characterize the known sound source;
- (c1) generating an ITD learned matrix by learning for the ITD measurement the averaged frequency verses time displacement matrix by repeating steps (a) and (b) with different positions of the known sound source;
- (c2) generating an ILD learned matrix by learning for the ILD measurement the averaged frequency verses time displacement matrix by repeating steps (a) and (b) with different positions of the known sound source;
- (d1) generating an ITD probability distribution matrix for the sound source location for each of said frequency channels by comparing for the ITD measurement a measured frequency verses time displacement matrix of a second sound source with the ITD learned matrix, wherein a position of said second sound source is unknown;
- (d2) generating an ILD probability distribution matrix for the sound source location for each of said frequency channels by comparing for the ILD measurement a measured frequency verses time displacement matrix of the second sound source with the ILD learned matrix;
- (e) generating a joint probability distribution for the second sound source by combining said ITD probability distribution matrix and said ILD probability distribution matrix; and
- (f) estimating the second sound source location based on the joint probability distribution.

\* \* \* \* \*